United States Patent [19]

Arends et al.

[11] 4,306,474
[45] Dec. 22, 1981

[54] TRIM PRESS WITH OSCILLATING CANOPY SHEET FEED

[75] Inventors: Albert W. Arends, Gladwin; George L. Pickard, Beaverton; George A. West, Clare, all of Mich.

[73] Assignee: Leesona Corporation, Beaverton, Mich.

[21] Appl. No.: 145,899

[22] Filed: May 2, 1980

[51] Int. Cl.³ .................. B26F 1/40; B65H 17/36; B65H 17/40
[52] U.S. Cl. .................................. 83/50; 83/251; 83/276; 83/278; 83/280
[58] Field of Search .............. 83/278, 276, 279, 280, 83/50, 251, 250, 282, 733, 411 R

[56] References Cited

U.S. PATENT DOCUMENTS

| 3,388,625 | 6/1968 | O'Brien et al. | 83/278 X |
| 3,461,760 | 8/1969 | White | 83/97 X |
| 4,005,626 | 2/1977 | Bateman et al. | 83/278 X |
| 4,173,161 | 11/1979 | Arends et al. | 83/278 |

Primary Examiner—Frank T. Yost
Attorney, Agent, or Firm—Learman & McCulloch

[57] ABSTRACT

An oscillating canopy is employed in the feeding of an elongate sheet of synthetic plastic material having articles, such as cups, for example, formed in the sheet, to a die which trims the articles from the sheet. The canopy has a downwardly concave curved upper portion upon which the sheet is supported by a series of rollers. The canopy is driven in forward and return strokes in pivotal movement about an axis located at a radial distance from the curved upper portion which is a greater distance from the discharge end of the curved upper portion than from the sheet receiving end so that tension is maintained on the sheet during the feeding stroke. The sheet-supporting rollers are mounted for rotation in one direction only, this direction being that in which the rollers can roll relative to the sheet on the return stroke of the canopy.

14 Claims, 4 Drawing Figures

TRIM PRESS WITH OSCILLATING CANOPY SHEET FEED

BACKGROUND OF THE INVENTION

Curvilinear canopies such as those disclosed in U.S. Pat. Nos. 3,461,760 and 4,173,161 are well known in the art of feeding elongate sheets of material in which articles, such as cups or the like, have been vacuum formed to punch out devices where a die is employed to trim the article from the sheet. In the usual case, the canopy is stationary and merely defines a curved path over which the sheet is guided in its transit from the forming machine to the trim press die. In these arrangements, step by step feeding movement of the sheet to advance successive articles into operative relationship with the die is accompanied by feeding fingers which engage projections formed along the edges of the sheet to advance the sheet in step by step movement synchronized with the reciprocatory stroke of the die. See, for example, U.S. Pat. No. 4,173,161.

Because these feeding fingers must, during their feeding stroke, pull a substantial length of the sheet across the stationary canopy, it has been suggested that the canopy itself be capable of being oscillated to accomplish the feeding action. However, prior attempts to provide an oscillating canopy feed have not proven satisfactory, primarily because problems of overtravel or bunching of the plastic sheet on the canopy have been encountered.

The present invention is especially directed to an oscillating canopy employed in the feeding of sheet material from a forming machine to a trim press which is constructed in a manner such that bunching of the material does not occur.

SUMMARY OF THE INVENTION

In the present invention, a curved canopy is mounted adjacent the receiving inlet of a trim press die for pivotal oscillation in which the discharge or downstream end of the canopy—that is, the end adjacent the die inlet—is driven in movement in a forward and return stroke of greater amplitude than is the opposite or upstream end of the canopy. The upper portion of the canopy, over which the sheet passes, is of a downwardly concave curved configuration. The axis of pivotal movement about which the canopy is driven in oscillation is located at a greater radial distance from the downstream discharge end of the canopy than from the upstream, or sheet receiving end, of the canopy. The sheet is supported upon the canopy by rollers provided with one-way clutches or some other suitable device which permit rotation of the rollers only in one direction. The direction of rotation of the rollers is such that when the lower end of the sheet is held stationary—as during operation of the die—the canopy may be driven in a return stroke with the rollers rolling freely beneath the canopy. When the canopy is driven in a forward stroke to advance the sheet toward the die, the rollers are locked against rotation in a direction which would permit the rollers to move forwardly beneath the canopy, thus the rollers frictionally grip the sheet to carry the sheet along with the forwardly stroking canopy.

Other objects and features of the invention will become apparent by reference to the following specification and to the drawings.

IN THE DRAWINGS

Figure 1:
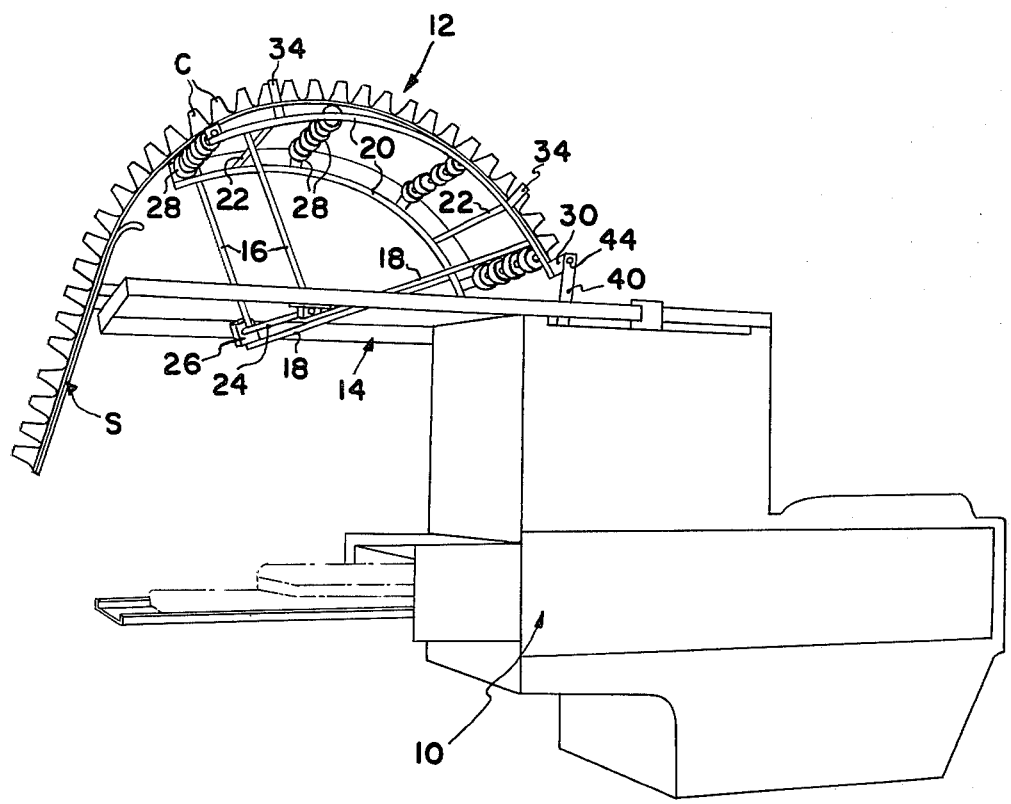
FIG. 1 is a perspective view of a trim press employing an oscillating canopy according to the present invention.

FIG. 1 shows an overall perspective view of a trim press, designated generally 10, upon which an oscillating canopy, designated generally 12, embodying the present invention, is mounted by means of a suitable frame 14 supported from trim press 10. An elongated sheet designated generally S, passes over canopy 12 and passes generally vertically downward into trim press 10.

Trim press 10 includes a horizontally reciprocable die which operates to trim the articles formed on the sheet S from the sheet. Trim presses of this type are well-known in the art; details of such a press are disclosed in U.S. Pat. No. 4,173,161 and for purposes of explanation of the present invention it may be assumed that trim press 10 includes a die such as shown in U.S. Pat. No. 4,173,161, the disclosure of which is herein incorporated by reference. Certain parts of the trim press 10 have been included in the drawings, particularly FIG. 3, and will be mentioned later.

Figure 2:
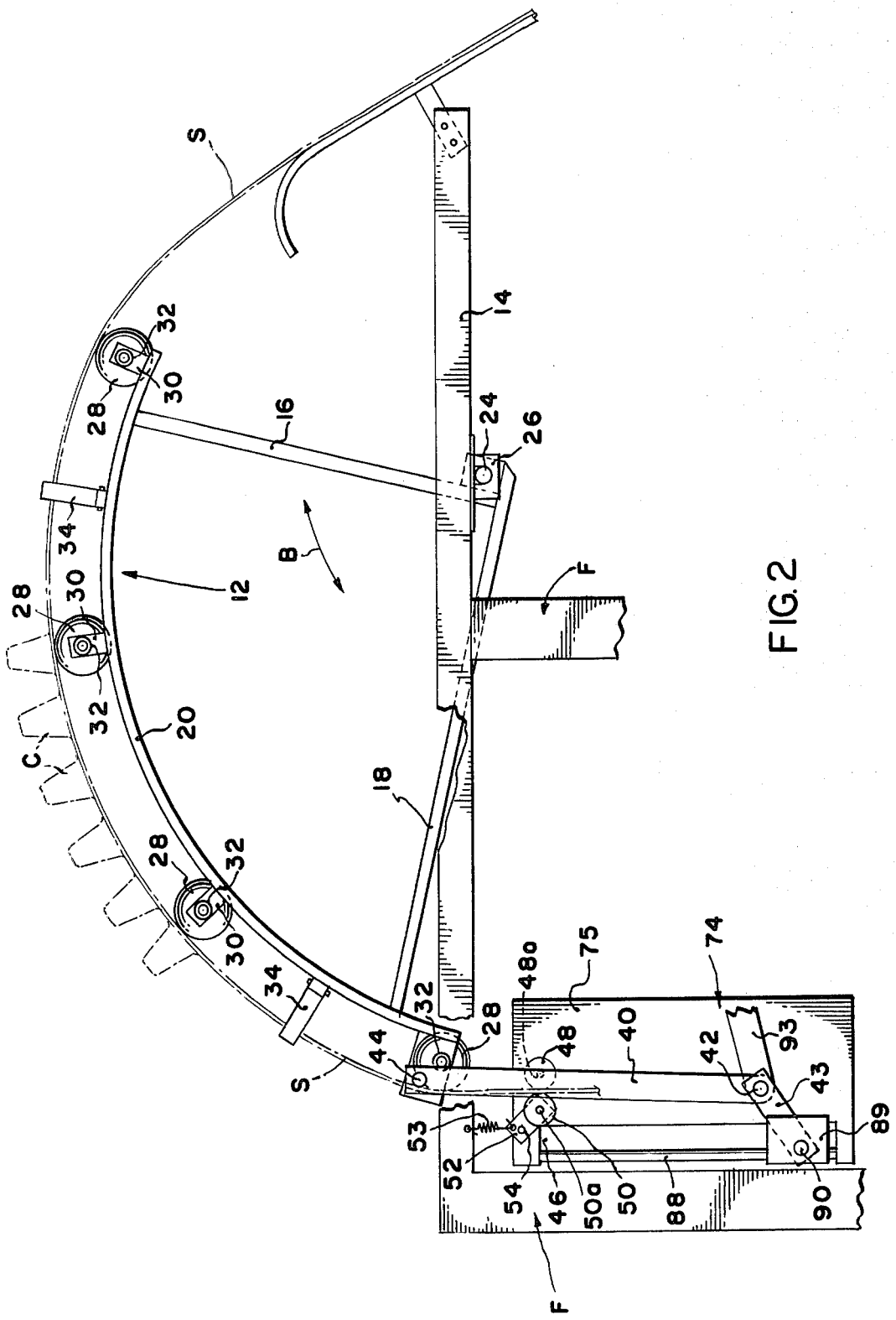
FIG. 2 is a detail side elevational view of the canopy of FIG. 1 with various parts omitted.

Referring now to FIG. 2, it is seen that canopy 12 includes two frame members 16 and 18 fixedly secured to each other, as by welding, and extending at approximately right angles to each other. A curved frame member 20 is fixedly secured to and extends between and beyond the ends of frame members 16 and 18 in a downwardly concave curved configuration. Referring briefly to FIG. 1, two like sets of frame members 16, 18 and 20, are rigidly connected to each other as by cross frame members 22, and a cross shaft 24 to form a rigid framework. Cross shaft 24 projects outwardly beyond the opposite sides of the framework so defined and is rotatively received within brackets 26 on fixed frame 14 so that canopy 12 is supported from frame 14 for oscillation about a horizontal pivot axis defined by the shaft 24 and brackets 26.

It will be noted from FIG. 2 that the frame members 18 of the canopy frame are longer than frame members 16 so that that end of the curved frame members 20 which is adjacent frame member 18 (the downstream end of canopy 12 with respect to the direction of feed of sheet S) is at a noticeably greater radial distance from the pivotal axis defined by cross shaft 24 than is that end (upstream end) of frame members 20 adjacent frame members 16. Thus, upon pivotal movement of canopy 12 about the axis of shaft 24, the end of the canopy adjacent frame member 18—the downstream end—will move a greater distance than will the opposite upstream end of the canopy (support 18 being longer than support 16).

Four series of rollers 28 are mounted upon and extend between the respective curved frame members 20, the rollers being mounted for rotation on shafts carried by mounting brackets 30. Rollers 28 are mounted for free rotation is one direction only—a counterclockwise direction, as viewed in FIG. 2—as by a suitable one-way clutch or ratchet arrangement 32 of conventional construction. Rollers 28 provide the sheet supporting surfaces of canopy 12 upon which the sheet S is supported. Side guide fingers such as 34 are mounted upon the cross frame members 22 to guide the sheet in movement longitudinally across the upper surfaces of rollers 28.

Canopy 12 is driven in pivotal oscillation about the axis of cross shaft 24 by a drive mechanism to be later more completely described, which includes a crank link 93 driven to swing in a generally vertical path. Drive links 40 are pivotally connected at one end by a pivot shaft 42 to link 93 and are privotally connected at their opposite upper ends by a pivot shaft 44 to the discharge end brackets 30 on canopy 12. Shaft 42 is supported by links 93 pivotally connected to a sheet guiding treadle assembly 74, which presently will be described, by shaft 90. The oscillation of link 93 results in a generally vertical reciprocatory movement of pivot 44 which causes canopy 12 to be oscillated back and forth through the arc designated B about pivot 24.

A one-way feed device, designated generally 46, is provided by pairs of rolls 48, 50, one set of rolls being engaged with each of the opposite side edges of sheet S. Each roll 48 is mounted for rotation about a fixed axis 48a on the treadle assembly which presently will be described, and each roll 50 is mounted in opposed relationship to a roll 48 for rotation about a shaft 50a which is mounted on one end of an arm 52 which is pivotally mounted at its opposite end as at 54 upon the treadle assembly, pivot shafts 54 being located about the axis of rotation of rolls 50. Both rolls 48 and 50 are freely rotatable in the downfeed direction, but not otherwise, a spring 53 biasing arms 52 upwardly about pivots 54 so that the sheet S is normally gripped between the pairs of rolls 48 and 50. Downward movement of the sheet as viewed in FIG. 2 between the pairs of rolls 48 and 50 finds the rolls rotating freely to permit downward passage of the sheet. However, any force upwardly on the sheet tends to swing arms 52 upwardly, in counterclockwise movement about pivots 54, thus causing the rolls 48 and 50 to press firmly against each other to pinch the sheet between them to thus resist upward movement of the sheet S.

Figure 3:
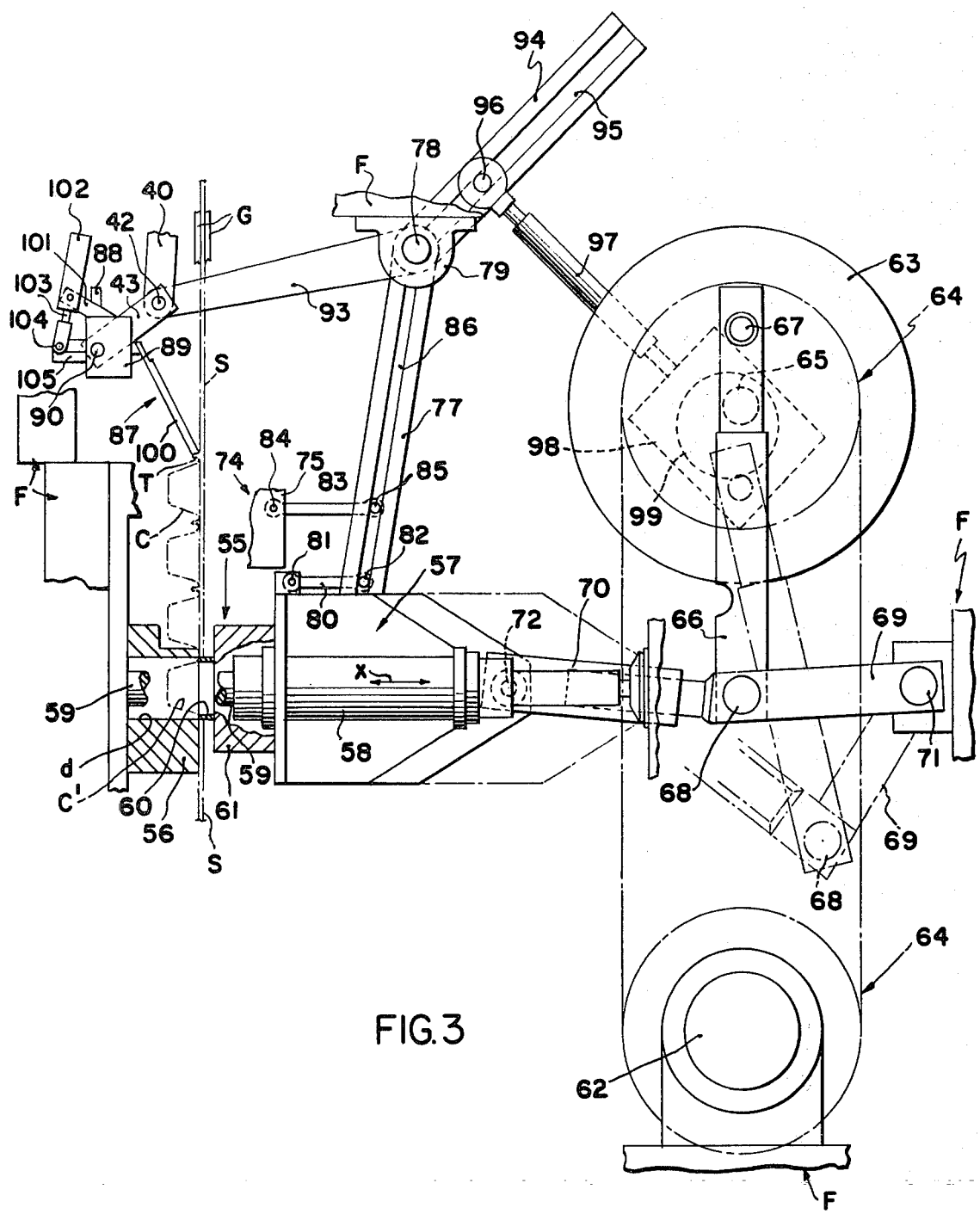
FIG. 3 is a fragmentary, side elevational view illustrating the drive mechanism particularly, certain parts of the press being omitted or broken away in the interests of clarity.

As indicated, the function of canopy 12 is to assist in the feeding of the sheet of thermoplastic material S in which the articles C are integrally formed, as in a differential pressure forming operation, to the trim press severing mechanism. As FIG. 3 illustrates, severing of the articles C from the sheet S is accomplished by a reciprocating punch assembly, generally designated 55, and a stationary female die assembly 56, which is fixedly mounted on Frame F. As FIG. 3 indicates, the punch assembly 55 includes a platen 57 having a pair of sleeves 58 which are slidably received upon horizontal guide rods 59 at the sides of the machine, fixedly mounted by the frame F. Hollow tubular punches 60 of a size and shape conformed to that of the horizontal row of articles C to be severed from the sheet are carried on the mounts 61 which attach to platen 57. Platen 57 is driven in reciprocatory movement in the direction x on the guide rods 59 by a drive assembly which includes a main drive motor 62 fixedly mounted on frame F. Drive motor 62 drives a flywheel 63 in rotation as by a chain and sprocket drive designated generally 64.

The flywheel 63 is supported upon frame F by a central shaft 65 which is in turn rotatably supported from frame F as by fixed bearing assemblies of conventional construction, not shown.

A main drive link 66 is pivotally coupled at one end to the drive pin 67 mounted on flywheel 63 in radially offset relationship to the flywheel shaft 65. At its opposite end, drive link 66 is pivotally connected, by a common pivot pin 68 to a guide link 69 and a connecting link 70. Guide link 69 is connected to frame F by a pivot pin 71, while connecting link 70 is pivotally connected to punch platen 57 by a pivot pin 72. The action of links 66, 69 and 70, in driving punch platen 57 upon rotation of flywheel 63, is such that the punch platen moves relatively slowly during its approach to and retraction from its extreme right-hand end limit of stroke, as viewed in FIG. 3, and moves more rapidly near its left-hand end limit of movement as viewed in FIG. 3. The advantages of this movement are more particularly discussed in the aforementioned patent.

The sheet S and the integrally formed articles C therein are guided into operative relationship with punch assembly 55 and die assembly 56 by a treadle assembly designated generally 74. This assembly, which is described in more detail in the patent mentioned, includes a pair of spaced side plates 75 which are interconnected to each other by transversely extending the rods (not shown). As in the patent mentioned, pairs of vertical guide strips G (FIG. 3) on the treadle assembly 74, are spaced from each other by a distance slightly greater than the thickness of the sheet S to be fed, which passes between and is guided by the opposed pairs of treadle strips in locations such that the projecting cuplike article C pass vertically between them. Reciprocatory movement of the treadle assembly 74 to accommodate the feeding action described in the aforementioned patent is accomplished by a linkage coupled between platen 57 and the treadle, which includes a coupling link 77, pivotally mounted for free pivotal movement about a shaft 78 which is, in turn, freely pivotal on frame F in bearings 79. A first connecting link 80 is pivotally coupled to platen 57 as at 81, and pivotally coupled to link 77 as at pivot 82. A second connecting link 83 is pivotally coupled to treadle 74 as at 84 and pivotally coupled to link 77 as at 85. Preferably, link 77 is formed with an elongate slot 86, and pivotal connections 82 and 85 are so designed that the pivots may be releasably clamped at selected positions of longitudinal adjustment along slot 86. Plainly, and as disclosed in the previously mentioned patent, the treadle 74 travels in horizontal reciprocatory movement in synchronism with the horizontal reciprocatory movement of the platen 57.

To aid in advancing the sheet S intermittently in synchronism with the strokes of punch assembly 55, a feed finger assembly, generally designated 87, is employed. This assembly includes a pair of vertical rods 88, fixedly mounted upon treadle 74 adjacent opposite sides of the treadle, which slidably receive transversely spaced blocks 89. The transversely extending shaft 90 is pivotally supported in and extended between blocks 89 and projects outwardly beyond the other side of each of blocks 89 to constitute a pivotal connection between blocks 89 and the pair of links 43. Arm 93 is fixedly secured to shaft 78, and arm 94 is likewise fixed to shaft 78, the two arms 93 and 94 constituting a bell crank which is pivotally supported from frame F by shaft 78. Arm 94 is formed with a slot 95 which receives an adjustable pivot 96 coupling arm 94 to an extensible link 97. The slotted connection between pivot 96 and arm 94 enables pivot 96 to be adjustably clamped to arm 94 at any selected position of longitudinal adjustment along slot 95.

At its opposite end, link 97 is connected to a block 98 which rotatably receives a trapped cam 99 of circular configuration which is fixedly mounted upon flywheel 63 in eccentric relation to flywheel shaft 65. Upon rotation of the flywheel 63, the eccentric disc 99 will oscillate link 97 and cause pivotal oscillation of the bell crank 94, 93 about its pivot point 78. This oscillation of the bell crank will, in turn, oscillate pivots 42 along an arc which extends generally vertically to impart a vertical component of oscillation to the pivots 42 and hence their connected links 40 and 43 to thus vertically oscillate blocks 89 upon their guide posts 88. Two or more feed fingers 100 are fixedly mounted upon the transversely extending shaft 90 carried by blocks 89, and are located transversely upon the shaft to engage the feeding tabs T formed on the sheet S. The vertical stroke of blocks 89 and hence fingers 100, slightly exceeds the distance between adjacent feed tabs T in a vertical direction so that as the fingers 100 move upwardly with the blocks 89, they are carried beyond and slightly above a particular horizontal row of feed tabs T which are then engaged by the fingers 100 as the blocks 89 begin their downward travel. The engagement between the fingers 100 and the tabs T during the downward travel of blocks 89, pushes the sheet downwardly to advance the sheet to the next succeeding row of cups C into alignment with the die cavities d while the platen 57 is retracted from the die a sufficient distance to permit the articles to pass between the punch 60 and die 56.

In order to withdraw feed fingers 100 out of engagement with the sheet S during upward movement of blocks 89, shaft 90 is supported in blocks 89 for rocking movement and fingers 100 are, as noted, clamped on shaft 90. On one of the blocks 89 an upwardly inclined arm 101 is fixedly mounted to pivotally support the cylinder of a reciprocating air motor 102. The piston rod 103 of air motor 102 is pivotally coupled as at 104 to a crankarm 105 fixedly coupled to shaft 90 so that extension or retraction of piston rod 103 rocks shaft 90 and its fixed fingers 100 about the axis of shaft 90.

THE OPERATION

In the operation of the machine, the sheet S passes from the discharge end (left-hand end as viewed in FIG. 2) downwardly past the one-way guide devices 46 into the die mechanism 55-56 shown in closed position in FIG. 3, following a stroke in which the forwardly moving dies 60 shear the articles at position C' from the sheet S. The set of feeding fingers 100 which aid in advancing the sheet S in vertical step by step movement are synchronized with the reciprocatory horizontal strokes of the die platen 57 so that as the die 60 is retracted, the feeding fingers 100 aid in advancing the sheet S downstream one step to position the next row of articles C in seated arrangement with the sockets d.

In the machine of U.S. Pat. No. 4,173,161 the canopy does not actively assist in the feeding of the sheet to the die mechanism, the entire feeding of the sheet being accomplished by the feed fingers as described above. In the present invention, feeding of the sheet is aided by the oscillating canopy 12.

Figure 4:
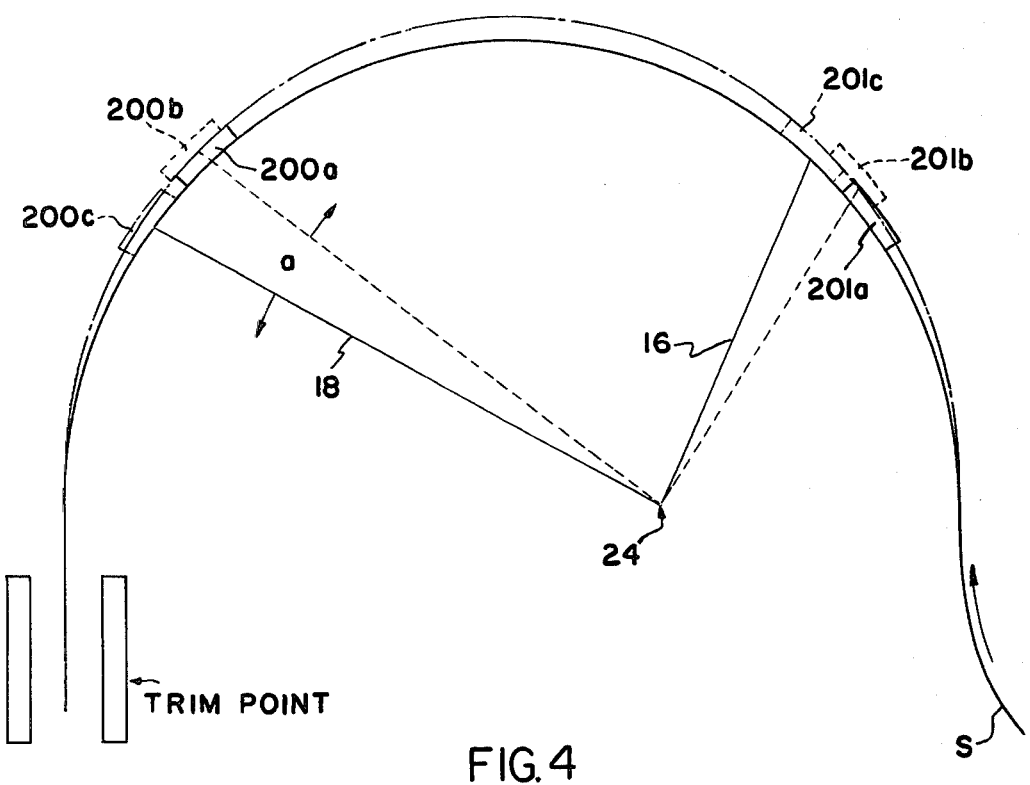
FIG. 4 is a schematic, fragmentary, side elevational view illustrating two canopy positions.

In FIG. 2, the canopy 12 is shown at or closely adjacent to the end of its return or non-feeding clockwise stroke—that is the canopy is at or closely adjacent to its extreme limit of clockwise pivotal movement about the axis of shaft 24 as viewed in FIG. 2. At this time, the die 60 (FIG. 3) of die mechanism 55 has just completed trimming an article from sheet S and has started on its retracting stroke and the feed fingers 100 are just about ready to commence a feeding stroke advancing sheet S downstream into die mechanism 58. This position of the canopy is indicated by the broken line in FIG. 4, the solid line indicating the position of the canopy when it is forwarded through its arc of travel "a". As in U.S. Pat. No. 3,329,995, incorporated herein by reference, a sagged length s of sheet is maintained, as usual, between the forming machine, which advances the sheet in indexed increments, and the canopy 12, as a take-up loop.

When drive 97 begins to rotate crank 93 downwardly in a counterclockwise direction about the axis of shaft 78, this action drives pivot 42, and hence links 40, downwardly. Downward movement of links 40 is transmitted to canopy 12 via pivots 44 to thus drive canopy 12 in counterclockwise pivotal movement from the position shown in FIG. 2. Because rollers 28 are locked against clockwise rotation as viewed in FIG. 2, the rollers exert a frictional force on the underside of sheet S to carry sheet S downstream along with canopy 12 as canopy 12 is driven in counterclockwise movement about the axis of shaft 24. This action, along with the downward motion of fingers 100 advances sheet S toward die mechanism 55. The canopy 12 and fingers 100 are timed to move synchronously together at the same vertical linear speed. Whereas, previously, the fingers 100 had to displace the sheet S an entire increment relative to take-up loop s on the forwarding stroke, this is no longer necessary. Only about half of the index of sheet S relative to the loop s is accomplished when the canopy 12 is moving counterclockwisely in FIG. 2 so the operation is far easier and trouble-free. When the canopy 12 returned clockwisely in its previous cycle, the canopy both moved the sheet S upwardly and slipped under the sheet S. This is demonstrated in FIG. 4 wherein a container 200, formed in sheet S and positioned at the front of canopy 12, advances from the position 200a to position 200b with clockwise movement of canopy 12 and pulls the whole sheet S forwardly from the take-up loop s about half the total incremental sheet index distance. During this movement, the container 201 at the rear of canopy 12 advances from the position 201a to the position 201b. When the canopy is subsequently moved counterclockwisely immediately, the container 200 is advanced to position 200c and the container 201 to the position 201c and the whole sheet S is pulled forwardly from take-off loop s the remaining half increment of index distance. This occurs because of the offset or eccentric position of pivot shaft 24 which has been described. Considering U.S. Pat. No. 4,173,161, feed fingers 100 thus move to assist in indexing sheet S the full increment between rows of cups C, but no longer have to pull a whole increment of sheet S from loop s across the canopy 12 on the sheet forwarding stroke.

Because the left-hand or downstream end of canopy 12, as viewed in FIG. 2, lies at a greater radial distance from the axis of shaft 24 than does the right-hand or upstream end of the canopy, the distance traveled by the left-hand end of canopy 12 for a given increment of angular movement of the canopy about the axis of shaft 24 exceeds the corresponding distance traveled by the right-hand end of the canopy. Thus, that portion of the sheet overlying canopy 12 is placed in tension because the portion of the sheet at the leading (downstream) end of the canopy is driven a greater distance (18) than that portion of the sheet at the trailing or upstream end (12) of the canopy. This tensioning of the sheet upon the canopy prevents overtravel of the rearward or trailing portions of the sheet, thus eliminating any tendency of the sheet to overtravel or bunch up on the canopy during the feeding stroke.

As previously stated, rollers 48 and 50 of the one-way guiding devices do not resist downward movement of the sheet through them. When fingers 100 reach lowermost position, the direction of rotation of drive 97 is immediately reversed to begin to swing crank 93 upwardly in a counterclockwise direction about its axis 78. This action drives links 40 upwardly, thus reversing the direction of pivotal movement of canopy 12 about the axis of shaft 24 to clockwise movement. Because rollers 28 on the canopy 12 are free to rotate in a counterclockwise direction as viewed in FIG. 2, clockwise pivotal movement of canopy 12 finds the rollers rolling smoothly and freely beneath sheet S. During this clockwise pivotal movement of canopy 12, the one-way guide roller mechanisms 46 clamp sheet S against upward movement through rollers 48 and 50 as described above. The lower portion of sheet S downstream from rollers 48, 50 is thus in dwell so that severing can most efficiently occur while the upstream portion of the sheet on canopy 12 is being advanced.

While one embodiment of the invention has been described, it will be apparent to those skilled in the art that the disclosed embodiment may be modified. Therefore, the foregoing description is to be considered exemplary rather than limiting, and the true scope of the invention is that defined in the following claims.

We claim:

1. In a trim press having cyclically operable die means for trimming articles from an elongate sheet of plastic material, and feed means movable in forward and return strokes toward and away from said die means for feeding said sheet in step by step movement longitudinally along a feed path to said die means in synchronism with the cyclic operation thereof; the improvement wherein said feed means includes a canopy frame having an elongate upper portion extending along said feed path from a discharge end adjacent said die means to a receiving end remote from said die means, said upper portion having a downwardly concave curved configuration in its extent longitudinally of said feed path, pivot means at the lower portion of said canopy frame supporting said frame for pivotal movement about a generally horizontal axis generally normal to the longitudinal extent of said feed path, drive means for driving said canopy frame in cyclic pivotal oscillation about said axis to drive said upper portion of said frame in forward and return strokes along said feed path toward and away from said die means, and sheet engaging means on said upper portion movable freely beneath said sheet on the return stroke of said frame and frictionally engageable with said sheet for urging said sheet forwardly during the forward stroke of said frame, said discharge end of said upper portion of said canopy frame being at a greater radial distance from said axis than said receiving end whereby the amplitude of oscillating movement of said discharge end is greater than that of said receiving end.

2. The invention defined in claim 1 wherein said sheet engaging means comprises a plurality of sheet supporting rollers mounted on said upper portion for free rotation in one direction only about axes parallel to said horizontal axis.

3. The invention defined in either of claims 1 or 2 further comprising one way gripping means upstream of said die means operable to accommodate movement of said sheet in a forward direction toward said die means and operable to prevent movement of said sheet in the opposite direction.

4. In a trim press having cyclically operated trim die mechanism and wherein an elongate sheet of plastic material is longitudinally advanced by feed elements in step by step movement along a feed path which extends over a downwardly concave curved top canopy to the trim die mechanism in the press, the improvement comprising means mounting said canopy for pivotal oscillation about a generally horizontal axis normal to said feed path and located below said feed path at a greater radial distance from the downstream end of said canopy than from the upstream end of said canopy, a plurality of one way roller means mounted on the top of said canopy for rotation about axes generally parallel to said generally horizontal axis, said rollers being disposed in underlying supporting engagement with said sheet at longitudinally spaced locations between the upstream and downstream ends of the top of said canopy and being rotatable only in that direction induced by downstream movement of said sheet relative to said canopy, and means for driving said canopy synchronously with the feed elements in pivotal oscillation about said axis to reciprocate the top of said canopy along said path.

5. The invention defined in claim 4 further comprising one way gripping means engageable with said sheet at a location between the downstream end of said canopy and said die mechanism, said gripping means being operable to permit movement of said sheet only in a downstream direction.

6. The invention defined in either of claims 4 or 5 wherein the feed elements comprise fingers driven in a vertical to and fro path by the means for driving the canopy.

7. In a method of assisting the feed of synthetic plastic sheet material having articles differential-pressure-formed therein at uniformly spaced intervals along the length of the sheet to cyclically operating, trim press, severing die mechanism which moves angularly to the sheet and its path of travel to sever articles from the sheet; the sheet being guided by an overhead downwardly concave canopy having an elongate upper portion defining a sheet approach portion of the feed path of the sheet extending from a downwardly directed canopy discharge end above the die mechanism to a remote sheet receiving end; the steps of:

swinging the canopy in a first direction away from the die mechanism through an arc which advances the portion of the sheet on the canopy by raising the sheet and by slipping the canopy along the sheet; and reversing the canopy to swing it in a second forwarding direction toward the die mechanism through an arc which lowers said portion of the sheet while frictionally gripping the sheet, to further advance the sheet.

8. The method of claim 7 wherein a portion of the sheet downstream from the portion on the canopy and opposite the die mechanism is stationary when the canopy is traveling in the first direction and severing takes place at this time.

9. In apparatus for assisting the feed of synthetic plastic sheet material having articles differential-pressure-formed therein at uniformly spaced intervals along the length of the sheet to cyclically operating, trim press, severing die mechanism which move angularly to the sheet and its path of travel to sever articles from the sheet; the combination with said die mechanism of a swingably mounted, overhead, downwardly concave canopy having an elongate upper portion defining a sheet approach portion of the feed path of the sheet extending from a downwardly directed canopy discharge end above the die mechanism to a remote sheet receiving end, the canopy having means thereon for frictionally gripping the sheet when the canopy is moved in one direction and releasing when the canopy is moved in the other direction; means for swinging the canopy in a first direction away from the die mechanism through an arc which advances the portion of the sheet on the canopy by raising the sheet and slipping the canopy along the sheet, and for swinging the canopy in a second reverse direction toward the die mechanism through a return arc while frictionally gripping the sheet to lower said portion of the sheet and advance the sheet through the remaining portion of its increment of travel; and means operated synchronously with the canopy swinging means for operating the severing die mechanism to sever articles from the sheet.

10. The method of claim 9 wherein feed assist elements on the trim press are engaged with the sheet adjacent the die mechanism and synchronously moved with said canopy in a path to index the sheet a full increment to assist in advancing it.

11. The method of claim 10 wherein means are provided between the feed assist elements and the canopy for restraining movement of the sheet in a direction away from the die mechanism while permitting its movement in a direction toward the die mechanism.

12. In a method of assisting the feed of synthetic plastic sheet material having articles differential-pressure-formed therein at uniformly spaced intervals along the length of the sheet to cyclically operating, trim press, severing die mechanism which moves angularly to the sheet and its path of travel to sever articles from the sheet; the sheet being guided by an overhead downwardly concave canopy having an elongate upper portion defining a sheet approach portion of the feed path of the sheet extending from a downwardly directed canopy discharge end above the die mechanism to a remote sheet receiving end which receives the sheet from a take-up loop between a differential pressure sheet former and the canopy; the steps of:

permitting a first portion of the sheet downstream from the canopy to remain stationary and severing articles from said portion of the sheet while advancing an upstream portion of the sheet on the canopy and pulling the sheet forwardly from the take-up loop; and indexing the first portion of the sheet relative to the die mechanism to locate the next articles to be severed opposite the die mechanism.

13. In apparatus for assisting the feed of synthetic plastic sheet material having articles differential-pressure-formed therein at uniformly spaced intervals along the length of the sheet to cyclically operating, trim press, severing die mechanism which moves angularly to the sheet and its path of travel to sever articles from the sheet; the combination with said die mechanism of an overhead, downwardly concave canopy having an elongate upper portion defining a sheet approach portion of the feed path of the sheet extending from a downwardly directed canopy discharge end above the die mechanism to a remote sheet receiving end which receives the sheet from a supply loop; means for operating the severing die mechanism to sever articles from the sheet; means permitting a first portion of the sheet downstream from the canopy to remain stationary while said severing is taking place and simultaneously advancing an upstream portion of the sheet on the canopy while pulling the sheet forwardly from the supply; and means for then indexing the said first portion of the sheet relative to the die mechanism to locate the next articles to be severed opposite the die mechanism.

14. The method of claim 13 wherein means are provided downstream from the canopy for restraining movement of the sheet in a direction away from the die mechanism while permitting its movement in a direction toward the die mechanism.

* * * * *